United States Patent
Carlsson et al.

(10) Patent No.: US 8,910,526 B2
(45) Date of Patent: Dec. 16, 2014

(54) DEVICE AND METHOD FOR INDICATING IF A FASTENING ELEMENT HAS REACHED A TENSILE YIELD LIMIT LOAD

(75) Inventors: Rolf Carlsson, Hallstahammar (SE); Christer Johansson, Gothenburg (SE); Fredrik Ahrentorp, Gothenburg (SE); Christian Jonasson, Gothenburg (SE); Jakob Blomgren, Gothenburg (SE)

(73) Assignee: Rocan System AB (SE)

( * ) Notice: Subject to any disclaimer, the term of this patent is extended or adjusted under 35 U.S.C. 154(b) by 86 days.

(21) Appl. No.: 13/701,524

(22) PCT Filed: Jun. 8, 2011

(86) PCT No.: PCT/EP2011/059491
§ 371 (c)(1),
(2), (4) Date: Dec. 3, 2012

(87) PCT Pub. No.: WO2011/154446
PCT Pub. Date: Dec. 15, 2011

(65) Prior Publication Data
US 2013/0074606 A1    Mar. 28, 2013

(30) Foreign Application Priority Data
Jun. 8, 2010 (SE) ...................................... 1050589

(51) Int. Cl.
G01B 7/16 (2006.01)
G01L 5/24 (2006.01)
G01L 5/00 (2006.01)
G01L 3/10 (2006.01)

(52) U.S. Cl.
CPC . *G01L 3/102* (2013.01); *G01L 5/24* (2013.01); *G01L 5/0042* (2013.01)
USPC .............................................. 73/761; 73/770

(58) Field of Classification Search
USPC ............................................ 73/760, 761, 779
See application file for complete search history.

(56) References Cited

U.S. PATENT DOCUMENTS

| | | | | |
|---|---|---|---|---|
| 5,154,084 A | * | 10/1992 | Sonderegger et al. | ........... 73/761 |
| 5,154,242 A | * | 10/1992 | Soshin et al. | .................. 173/178 |
| 5,280,725 A | * | 1/1994 | Stengel | ........................... 73/761 |
| 5,571,971 A | * | 11/1996 | Chastel et al. | ................... 73/761 |
| 7,260,997 B2 | * | 8/2007 | Luethje et al. | ................... 73/761 |
| 7,484,427 B2 | * | 2/2009 | Kolkind | ..................... 73/862.23 |
| 8,534,132 B1 | * | 9/2013 | Purdy | .............................. 73/761 |
| 2002/0148299 A1 | * | 10/2002 | Leong | ............................. 73/761 |
| 2008/0314163 A1 | | 12/2008 | Harata et al. | |

FOREIGN PATENT DOCUMENTS

JP    56019423    2/1981

OTHER PUBLICATIONS

International Search Report for PCT/EP2011/059491, Completed by the European Patent Office on Nov. 17, 2011, 2 Pages.

\* cited by examiner

*Primary Examiner* — Max Noori
(74) *Attorney, Agent, or Firm* — Brooks Kushman P.C.

(57) ABSTRACT

A device and method for indicating if a fastening element upon fastening to a piece has reached a tensile yield limit load. The fastening element includes a threaded shaft having a magnetostrictive material. The device includes a mechanism for generating an alternating magnetic field that penetrates the shaft, a mechanism for measuring a physical quantity that depends on the momentary magnetic susceptibility of the shaft and a control unit adapted to detect a significant change of the physical quantity and determine and indicate if the shaft of the fastening element has reached the tensile yield limit load.

13 Claims, 9 Drawing Sheets

DEVICE AND METHOD FOR INDICATING IF A FASTENING ELEMENT HAS REACHED A TENSILE YIELD LIMIT LOAD

CROSS-REFERENCE TO RELATED APPLICATION

This application is the U.S. national phase of PCT Appln. No. PCT/EP2011/059491 filed on Jun. 8, 2011, which claims priority to Swedish Patent Application No. 1050589-9 filed on Jun. 8, 2010, the disclosures of which are incorporated in their entirety by reference herein.

TECHNICAL FIELD OF THE INVENTION

The present invention relates to a device and a method for indicating if a fastening element at fastening in a piece has reached a tensile yield limit load. The fastening element comprises a threaded shaft, which shaft comprises a magnetostrictive material.

PRIOR ART

At fastening of the fastening element in the piece influence of friction between the fastening element and the piece results in that the stress in the fastening element only roughly can be estimated. If the fastening element is loaded to a too high stress the fastening element can be weakened or break. Due to the uncertainty in the stress of the fastening element, it is necessary to fastening the fastening element with a safety marginal to an optimal load. Accordingly, the fastening element is not used optimally, which results in that thicker dimensions or greater number of fastening elements is necessary. The thicker dimension of the fastening element or the greater number of fastening elements subsequent results in that the weight of a structure comprising the fastening element and the piece increases. In many application, it is important that the weight of the structure is limited. For example when fastening element is used in transport structures, such as cars, trains, aeroplanes, etcetera, an increased weight of the structure results in increased operation costs. It is also important that the fastening element is fasten with sufficient high stress for the structure to be held together in a safe manner.

Known methods for measuring the stress in fastening elements is based on that an ultrasonic signal is sent by means of a transmitter from a torsion head of the fastening element to the end of the shaft of the fastening element, wherein the signal is reflected at the end of the shaft of the fastening element. The method has the disadvantage that the transmitter and the torsion head of the fastening element must be in physical contact with each other and that contact means, such as a gel or similar is necessary in order to obtain sufficient signal transferring. Thereby it is difficult to perform the measurement of the stress in the fastening element at a rotating state of the fastening element. Furthermore, it may be necessary to use special designed ends of the shaft of the fastening element in order to obtain sufficient signal response.

A method for measuring a single axis tensile yield limit load of a shaft comprising a magnetostrictive material is known. The method is based on identifying a maximum of the magnetic susceptibility, which maximum corresponds to the single axis tensile yield limit load. The method is on the other hand not applicable to a multi axis stress condition for determining a tensile yield limit load, such as at fastening of a fastening element comprising tensile and torsion stresses, because the maximum of the magnetic susceptibility does not correspond to the multi axis tensile yield limit load.

The document JP56019423 relates to a device for determining an axial force in a screw that is fastened in a structure. The determination is based on measurement of magnetic changes that is formed by means of compressive stresses in the head of the screw.

SUMMARY OF THE INVENTION

A first object of the present invention is to provide a device and a method for indicating if a fastening element at fastening in a piece has reached a tensile yield limit load. A second object of the present invention is to provide a device and a method for controlling the fastening of a fastened element in dependency of a tensile yield limit load. A third object of the present invention is to provide a device and a method for fastening a fastening element to an optimal load.

The first object is achieved by means of a device according to the claims and being characterized in that the device comprises means for generating an alternating magnetic field that penetrates the shaft, means for measuring a physical quantity that depends on the momentary magnetic susceptibility of the shaft, wherein the means for measuring the physical quantity is adapted to be exposed to said magnetic field after the magnetic field's penetration of the shaft, a control unit adapted to receive measured values of said physical quantity and detect a significant change of the physical quantity, wherein the control unit is adapted to based on the significant change determined and indicate if the shaft of the fastening element has reached the tensile yield limit load.

The momentary magnetic susceptibility of the shaft is changed at a change of the stress in the shaft of the fastening element that comprises the magnetostrictive material. The generated magnetic field is influenced at penetration of the shaft by the momentary magnetic susceptibility of the shaft. The means for measuring the physical quantity is exposed to the magnetic field after its penetration of the shaft and is adapted to measure the physical quantity, which physical quantity depends on the momentary magnetic susceptibility of the shaft.

The control unit is adapted to receive measured values of the physical quantity from the means for measuring the physical quantity and to detect the significant change of the physical quantity. The significant change of the physical quantity corresponds to the tensile yield limit load of the shaft of the fastening element. When detecting the significant change of the physical quantity the control unit is adapted to indicate that the fastening element has reached the tensile yield limit load.

The term "tensile yield limit load" relates to the load when the material of the shaft of the fastening element transcends from an elastic state to a plastic state.

The term "the momentary magnetic susceptibility", often denoted with the Greek letter $\chi$, relates to a material property that describes how magnetic a material becomes in an external magnetic field. For magnetostrictive materials, the momentary magnetic susceptibility is influenced by the stress in the material.

The device has the advantage that no physical contact with the fastening element is necessary for indicating the tensile yield limit load. Thereby, the tensile yield limit load can be indicated during fastening of the fastening element in the piece. By means of the device, it is possible to avoid that the fastening element is being fastened to a load that results in a weakening or break of the fastening element. Moreover, the risk that the fastening element is fastened to a too low stress for holding together the structure is reduced.

Based on the information on tensile yield limit load it is possible to optimize the fastening of the fastening element in the piece. Thereby, it is possible to reduce the weight of a structure comprising the fastening element and the piece. The device can be used on all types of fastening elements with a shaft that comprises a magnetostrictive material.

According to an embodiment of the invention, the significant change of the physical quantity is detected in relation to a strain of the shaft.

According to an embodiment of the invention, the strain of the shaft is determined based on a rotation of the fastening element or a threaded fastening installation element, and a threaded pitch of said threaded shaft or fastening installation element.

The term "threaded pitch" relates to the degree of displacement of the shaft or the fastening installation element in axial direction at a certain rotation of the fastening element. The threaded pitch differs between different variants of fastening elements and different variants of fastening installation elements. The fastening installation element is for example a bolt or similar element that at a rotation influences the stress in the shaft of the fastening element.

According to an embodiment of the invention, the control unit is adapted to identify a mainly constant rate of change of the physical quantity in relation to the strain of the shaft, wherein said significant change of the physical quantity is detected when a change from the mainly constant rate of change of the physical quantity exceeds a first certain value.

The mainly constant rate of change of the physical quantity is present at least during a part of the elastic state until the tensile yield limit load of the fastening element. At the tensile yield limit load the significant change of the physical quantity arises, which change deviates from the mainly constant rate of change.

According to an embodiment of the invention, the control unit is adapted to detect the significant change of the physical quantity when an absolute change of the physical quantity from any of an initial value or a maximal value has arisen.

The significant change of the physical quantity at the tensile yield limit load based on the absolute change of the physical quantity is different for different variants of fastening elements, such as fastening elements with different strength, length, geometry, dimensions, etcetera.

According to an embodiment of the invention, the fastening element is fastened with a constant or a mainly constant rotation speed, wherein the significant change of the physical quantity is detected in relation to the time for the fastening of the fastening element. The strain of the shaft of the fastening element at a constant rotation speed is dependent on the time of the fastening.

According to an embodiment of the invention, the means for measuring the physical quantity is a sensor element adapted to be exposed to said magnetic field after the magnetic field's penetration of the shaft, wherein said physical quantity is at least one of a resistance and an inductance of the sensor element. The resistance and the inductance of the sensor element are dependent on the momentary magnetic susceptibility of the shaft.

According to an embodiment of the invention, the sensor element is adapted to at least partly surround a torsion head of the fastening element while the torsion head is affected by a torsion force.

According to an embodiment of the invention, the sensor element is an inductive component, such as a coil. The inductive component is adapted to at exposure of the alternating magnetic field induce an electrical current, which electrical current is being detected by the control unit.

According to an embodiment of the invention, the means for generating the alternating magnetic field is adapted to receive an alternating electric current with a frequency between 1 Hz and 1 MHz, preferably between 28 Hz and 350 Hz, wherein said alternating magnetic field is being generated.

According to an embodiment of the invention, the means for generating the alternating magnetic field is an inductive component, such as a coil, which inductive component is adapted to at least partly surround a torsion head of the fastening element while the torsion head is affected by a torsion force.

According to one embodiment of the invention, the inductive component is a magnetic field sensor detecting the magnetic field based on one of the Hall-effect and the magnetoresistance of the sensor.

According to an embodiment of the invention, the device comprises means for generating a static magnetic field that penetrates the shaft. By means of the static magnetic field the significant change of the physical quantity is enhanced, wherein the detection of the significant change of the physical quantity is facilitated.

The second object of the invention is provided by an embodiment of the invention according to the claims, wherein the device comprises a torsion transfer unit adapted to transfer a torsion force to the fastening element or a threaded fastening installation element, wherein the torsion transfer unit is adapted to by means of the control unit be controlled in dependency of an indication of a reached tensile yield limit load.

According to an embodiment of the invention, the control unit is adapted to interrupt the torsion transfer unit transferring of the torsion force to the fastening element at an indication of a reached tensile yield limit load. Thereby, the fastening element is prevented from being loaded into the plastic state.

According to an embodiment of the invention, the control unit is adapted to interrupt the torsion transfer unit's transferring of the torsion force to the fastening element at an indication of a tensile yield limit load according to the Rp0.2 limit.

According to an embodiment of the invention, the control unit is adapted to store information of a reached tensile yield limit load for a specific fastening element.

The third object of the invention is provided by an embodiment of the invention according to the claims, wherein the torsion transfer unit is adapted to based on indication of a reached tensile yield limit load rotate the fastening element so that the load of the fastening element is corrected with a certain correction value.

The tensile yield limit load is used as a reference for correcting the load of the fastening element in the piece with a certain correaction value. By means of the correction, it is possible to load the fastening element with the certain correction value from the tensile yield limit load into the plastic state or with the certain correction value into the elastic state.

According to an embodiment of the invention, the control unit is adapted to store information of said correction with the certain correction value from the tensile yield limit load for a specific fastening element.

According to an embodiment of the invention, the control unit is adapted to receive measuring values for said physical quantity and store information of the physical quantity at a termination of the fastening of the fastening element. The fastening of the fastening element is terminated at the tensile yield limit load or after the correction of the stress of the fastening element with the certain correction value from the tensile yield limit load.

According to an embodiment of the invention, the device is adapted, after terminated fastening of the fastening element, to generate an alternating magnetic field that penetrates the shaft of the fastening element by means of the means for generating the alternating magnetic field, measuring the physical quantity that depends on the momentary magnetic susceptibility of the shaft by means of the means for measuring the physical quantity, comparing the physical quantity at fastening of the fastening element with the physical quantity a time period after terminated fastening, and determining if the change of the physical quantity exceeds a certain control value by means of the control unit, wherein the control unit is adapted, when the physical quantity exceeds the certain control value for the change, to indicate that the change exceeds the certain control value.

A time period after terminated fastening of the fastening element, such as a couple of months or years, the stress in the fastening element may decrease due to movements in the piece, the material in the piece or the fastening element yields, etcetera. By means of comparing the physical quantity that depends on the momentary magnetic susceptibility at termination of the fastening with the momentary magnetic susceptibility a time period after terminated fastening, it is possible to detect a change in the stress of the fastening element. Thereby, it is possible to detect fastening element that a time period after terminated fastening has not sufficient high stress.

Previous mentioned object is also achieved by means of a method according to the claims. The method according to the claims comprise the steps of
  generating an alternating magnetic field that penetrates the shaft,
  measuring a physical quantity that depends on the momentary magnetic susceptibility of the shaft,
  detecting a significant change of the physical quantity,
  determining if the shaft of the fastening element has reached the tensile yield limit load based on the significant change of the physical quantity, and
  indicating that the fastening element has reached the tensile yield limit load in dependency of said determination.

According to an embodiment of the invention, the method comprises the steps of:
  identifying a mainly constant rate of change of the physical quantity in relation to a strain of the shaft, and
  detecting said significant change of the physical quantity when a deviation from the mainly constant rate of change of the physical quantity reaches or exceeds a first certain value.

According to an embodiment of the invention, the method comprises the steps of:
  identifying an absolute change of the physical quantity from any of an initial value or a maximal value of said physical quantity,
  detecting said significant change of the physical quantity when the absolute change of the physical quantity reached a first certain value.

According to one embodiment of the invention, the method comprises:
  determining the strain of the shaft,
  identifying a mainly constant rate of change of the physical quantity in relation to an increased strain of the shaft,
  establishing a line in a graph representing the strain on a first axis versus the physical quantity on a second axis so that the line originates from a certain offset strain value at the first axis and extends with said identified constant rate of change,
  detecting said significant change of the physical quantity when the measured physical quantity intersects the established line with a certain error margin, and
  indicating that the fastening element has reached the offset tensile yield limit load if the measured physical quantity intersects the established line with the certain error margin.

In some situation, the tensile yield limit load is difficult to determine from the shape of the stress-strain curve due to that the yield point is not well defined. In such situation, the tensile yield limit load may be defined based on the constant rate of change of the physical quantity, preferably the inductance, in relation to the offset strain, such as 0.1 or 0.2% strain. The significant change is detected when a point of the measured physical quantity with the determined strain intersects the established line in the graph representing the strain versus the physical quantity.

The intersection of the measured physical quantity with the determined strain is detected with an error margin corresponding to that the difference between the measured physical quantity at the determined strain and the physical quantity of the established line at the corresponding strain of the line is less than the second certain value.

The determination of the significant change using the offset strain provides an improved reliability in determining and indicating that the fastening element has reached the tensile yield limit load in comparison to a deviation from a the mainly constant rate of change of the physical quantity.

The term "constant rate of change" refers to the slope of the values of measurements of the physical quantity with the determined strain.

According to one embodiment of the invention, the method comprises:
  detecting said significant change of the physical quantity when a difference between the measured physical quantity at the determined strain and the value of the physical quantity of the established line at the corresponding strain of the established line is less than a second certain value, and
  indicating that the fastening element has reached the offset tensile yield limit load if said difference is less than the second certain value.

According to one embodiment of the invention, the method comprises:
  detecting said significant change of the physical quantity when a difference between the strain of the measured physical quantity and the value of the physical quantity of the established line at the corresponding value of the established line is less than a third certain value, and
  indicating that the fastening element has reached the offset tensile yield limit load if said difference is less than the third certain value.

According to one embodiment of the invention, the method comprises:
  determining the strain of the shaft based on a rotation of the fastening element or a threaded fastening installation element, and a threaded pitch of said threaded shaft or fastening installation element.

According to one embodiment of the invention, the method comprises:
  terminating the fastening of the fastening element in dependency of an indication that the fastening element has reached the tensile yield limit load.

According to an embodiment of the invention the method comprises the steps of:
rotating the fastening element based on an indication of a reached tensile yield limit load so that the load of the fastening element is corrected with a certain correction value.

BRIEF DESCRIPTION OF THE DRAWINGS

The invention will now be explained in detail with description of different embodiments of the invention and with reference to the appended drawings.

FIG. 1b discloses an enlargement of a part of the device that is disclosed in FIG. 1a.

DETAILED DESCRIPTION OF PREFERRED EMBODIMENTS OF THE INVENTION

Figure 1A:
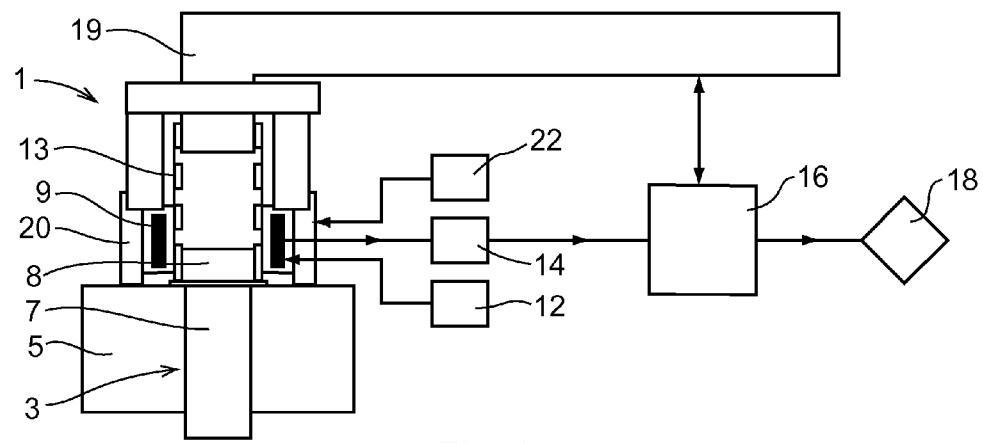
FIG. 1a discloses an device according to an embodiment of the invention.
Figure 1B:
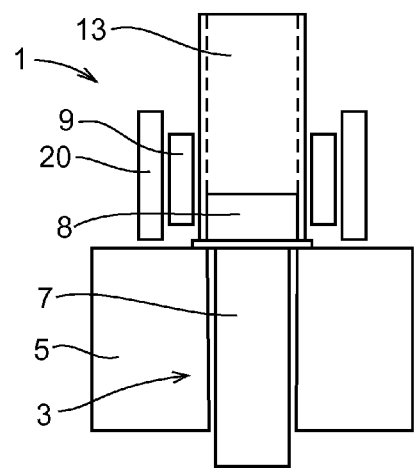

FIG. 1a discloses a cross section of a device 1 for determining and indicating if a fastening element 3 at fastening in a piece 5 has reached a tensile yield limit load. FIG. 1b discloses an enlargement of a part of the device 1 that is shown in FIG. 1a. The determination and the indication of the tensile yield limit occurs accordingly in real time during fastening of the fastening element 3.

The fastening element 3 comprises a threaded shaft 7 that comprises a magnetostrictive material. The fastening element 3 can for example be a screw or similar threaded element. The threaded shaft 7 comprises a magnostrictive material, which material's magnetic properties are influenced by mechanical stress in the material. The magnetostrictive material comprises for example different alloys of iron or nickel. The fastening element 3 has a torsion head 8 in connection to the threaded shaft 7 for receiving a torsion force.

The device 1 comprises means 9, 12 for generating an alternating magnetic field that penetrates the shaft 7 and the torsion head 8. In the disclosed embodiment in the figure, the means for generating the alternating magnetic field comprises a first coil 9 that is provided with an alternating current from a first current supply unit 12. The first coil 9 is positioned around the torsion head 8 without being in contact with the torsion head 8. Between the first coil 9 and the torsion head 8 is an air gap present located and an external torsion socket 13 is adapted to transfer a torsion force to the torsion head 8.

The device 1 comprises means 9, 14 for measuring a physical quantity that depends on the momentary magnetic susceptibility of the shaft 7. The means for measuring the physical quantity comprises a sensor element adapted to be influenced by the alternating magnetic field. In FIGS. 1a and 1b, the sensor element is a coil, in this case the first coil 9. The first coil 9 is adapted to be exposed by the alternating magnetic field after the magnetic field's penetration of the shaft 7. The means for measuring the physical quantity comprises also a measuring unit 14 adapted to measure the physical quantity that arises in the first coil 9 after being exposed to the alternating magnetic field. The physical quantity is for example the inductance and the resistance of the first coil 9. The measuring unit 14 is adapted to measure the physical quantity based on the current that is being induced in the first coil 9 due to the alternating magnetic field.

In the disclosed embodiment, the means 9, 12 for generating the alternating magnetic field and the means 9, 14 for measuring the physical quantity is accordingly the same first coil 9. In another embodiment, the means 9, 12 for generating the alternating magnetic field and the means 9, 14 for measuring the physical quantity are different coils.

The device 1 comprises a control unit 16 adapted to receive measuring values of the physical quantity from the measuring unit 14. The control unit 16 is adapted to detect a significant change of the physical quantity based on the received measured values of the physical quantity. The control unit 16 is adapted, at a detection of the significant change, to determine and indicate if the shaft 7 of the fastening element 3 has reached the tensile yield limit load. The indication of the tensile yield limit load can for example be realized by means of an indication means 18, such as a lamp, a loud speaker or similar indication means 18.

The device 1 comprises a torsion transfer unit 19 adapted to transfer a torsion force to the torsion head 8 of the fastening element 3. The torsion force is transferred by means of a torsion socket 13.

According to an embodiment of the invention, the indication of a tensile yield limit load is realized by means of that the control unit 16 transmits a stop signal to the torsion transfer unit 19, wherein the transfer of the torsion force from the torsion transfer unit 19 to the torsion head 8 of the fastening element is interrupted. In another embodiment, the indication of the tensile yield limit load is realized by means of that the control unit 16 transfers an indication signal to the torsion transfer unit 19, which indication signal induces the torsion transfer unit 19 to transfer a torsion force to the torsion head 8 of the fastening element 3 so that the load of the fastening element 3 is corrected with a certain correction value from the tensile yield limit load.

The control unit 16 is accordingly adapted to control the torsion transfer unit's transfer of torsion force to the torsion head 8 of the fastening element 3 in dependency of an indication of a reached tensile yield limit load. Thereby, the control unit 16 is adapted to correct a reached tensile yield limit load with a certain correction value. The fastening element 3 can be corrected with the certain correction value from the tensile yield limit load so that the fastening element 3 resumes into the elastic state or so that the fastening element 3 enters into the plastic state.

The device 1 comprises means 20, 22 for generating a static magnetic field that penetrates the shaft 7. The static magnetic field is for example generated by means of a second coil 20 that surrounds the torsion head 8 of the fastening element 3. The second coil 20 generates the static magnetic field by means of that a second current supply unit 22 provides the second coil 20 with a direct current. The second coil 20 is positioned around the first coil 9.

The torsion head 8 extends in a plane that is mainly parallel with a surface of the piece 5. The first coil 9 is being essentially arranged in said plane. In the same way, the second coil 20 is essentially arranged in the plane. Thereby, the generated alternating magnetic field and the static magnetic field penetrates the shaft 7 of the fastening element 3.

The first coil 9 is adapted to receive an alternating current with a frequency between 1 Hz and 1 MHz, preferably between 28 Hz and 350 Hz, for generating the alternating magnetic field. At a too high frequency of the generated alternating magnetic field the magnetic field can not penetrate the surface of the fastening element 3 due to the so called skin effect. Accordingly, it is not possible to detect a tensile yield limit load of the fastening element 3 at too high frequencies.

Figure 1C:
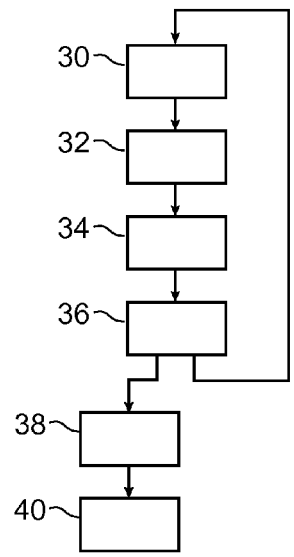
FIG. 1c discloses a block diagram over a method according to a first embodiment of the invention.

FIG. 1c discloses a block diagram of a method for determining a tensile yield limit load at fastening of the fastening element 3. The method is adapted to be used continuously during fastening of the fastening element 3.

Block 30 of the method comprises generating an alternating magnetic field that penetrates the shaft 7 of the fastening element 3. Thereby, the magnetic field is influenced by the magnetostrictive properties of the shaft 7 of the fastening element 3.

In block 32 the method comprises measuring a physical quantity that depends on the momentary magnetic susceptibility of the shaft 7 of the fastening element 3. The physical quantity is for example the resistance or the inductance of the first coil 9.

In block 34 the method comprises detecting a significant change of the physical quantity. In an embodiment of the method, the detection of the significant change of the physical quantity is realized by means of identifying a mainly constant rate of change of the physical quantity in relation to the strain of the shaft 7 of the fastening element 3 and to identify a deviation from the mainly constant rate of change of the physical quantity. In another embodiment of the method, the detection of the significant change of the physical quantity is realized by means of detecting an absolute change of a physical quantity based on an initial value or an maximal value of the physical quantity.

In block 36 the method comprises determining if the shaft 7 of the fastening element has reached the tensile yield limit load based on the significant change of the physical quantity. At a determination that the fastening element 3 has reached the tensile yield limit load, the method comprises according to block 38 indicating that the tensile yield limit load has been reached.

According to an embodiment of the invention the indication comprises transferring an indication signal, which indication signal in block 40 initiates a correction of the load of the fastening element 3.

At lack of a determination of a reached tensile yield limit load, the method is repeated from block 30. Accordingly, the method is adapted to be iterated until the tensile yield limit load is being indicated.

FIGS. 2a, 2b, 3a and 3b discloses different embodiments of the control unit's 16 detection of the significant change of the physical quantity.

Figure 2A:
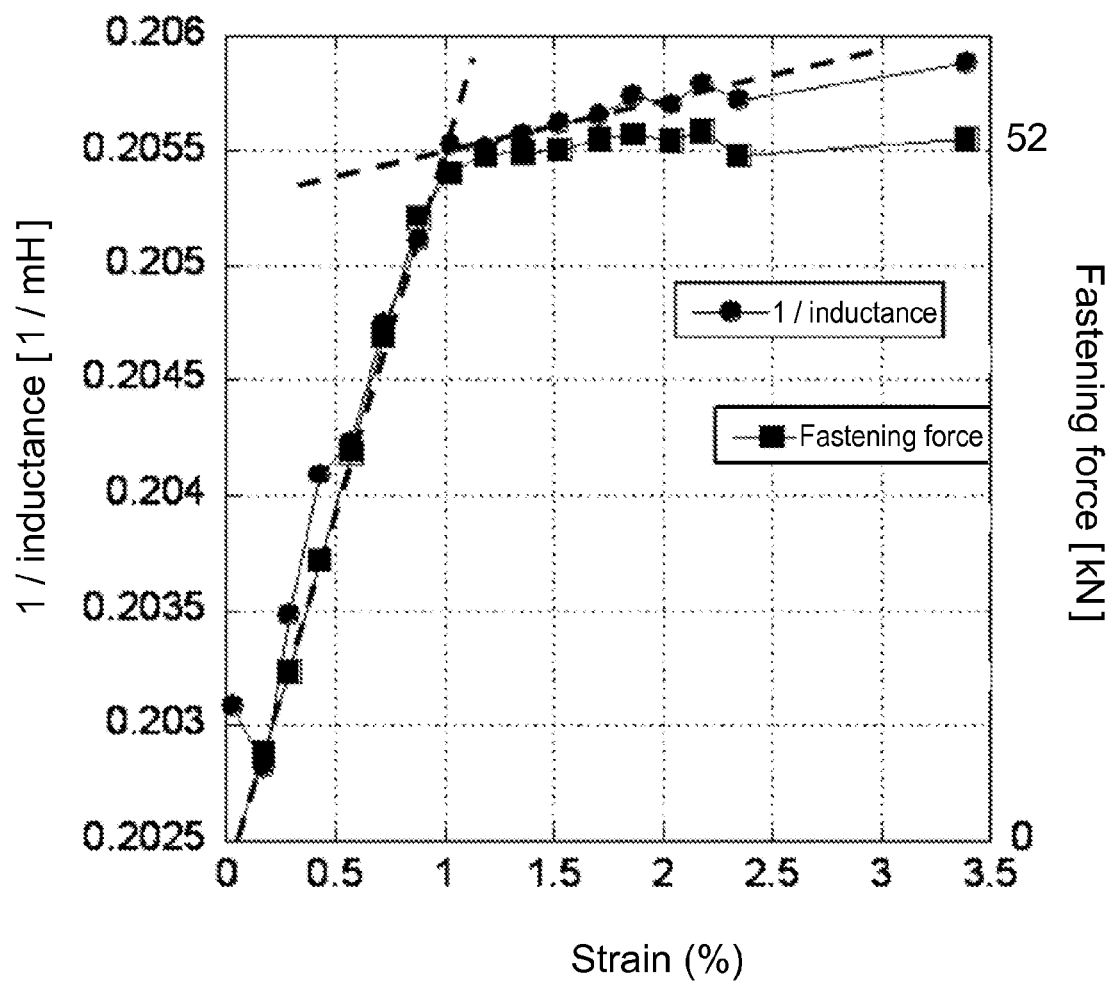
FIG. 2a discloses an example of a diagram for detecting a significant change of a physical quantity based on the inverse of the inductance.

FIG. 2a discloses a diagram over the inverse of the inductance and the fastening force with the strain of the fastening element 3. In FIG. 2a, the significant change of the physical quantity the inverse of the inductance is detected by means of identifying the mainly constant change of the inverse of the inductance in relation to the strain of the shaft 7 of the fastening element 3. The significant change of the physical quantity the inverse of the inductance is detected when a deviation from the mainly constant rate of change of the physical quantity the inverse of the inductance exceeds a first certain value.

In FIG. 2a the continuous rate of change of the inverse of the inductance in relation to the strain from about 0.3% strain up to about 1.0% strain is seen. The continuous rate of change is represented by means of a dotted line. The continuous rate of change corresponds with the continuous rate of change of the fastening force in relation to the strain when the fastening element 3 is present in the elastic state.

At about one percent strain the continuous rate of change of the inverse of the inductance in relation to the strain is deviating and a new rate of change is initiated. The deviating rate of change is drawn with a dashed and dotted line which rate of change is slower than the initial identified rate of change. The deviating rate of change does not necessarily need to be continuous.

In FIG. 2a the fastening force in relation to the strain is also drawn. It can be seen that the deviation of the mainly constant rate of change of the inverse of the inductance corresponds with the transition from an elastic state to a plastic state, that is the tensile yield limit load for the fastening element 3.

Figure 2B:
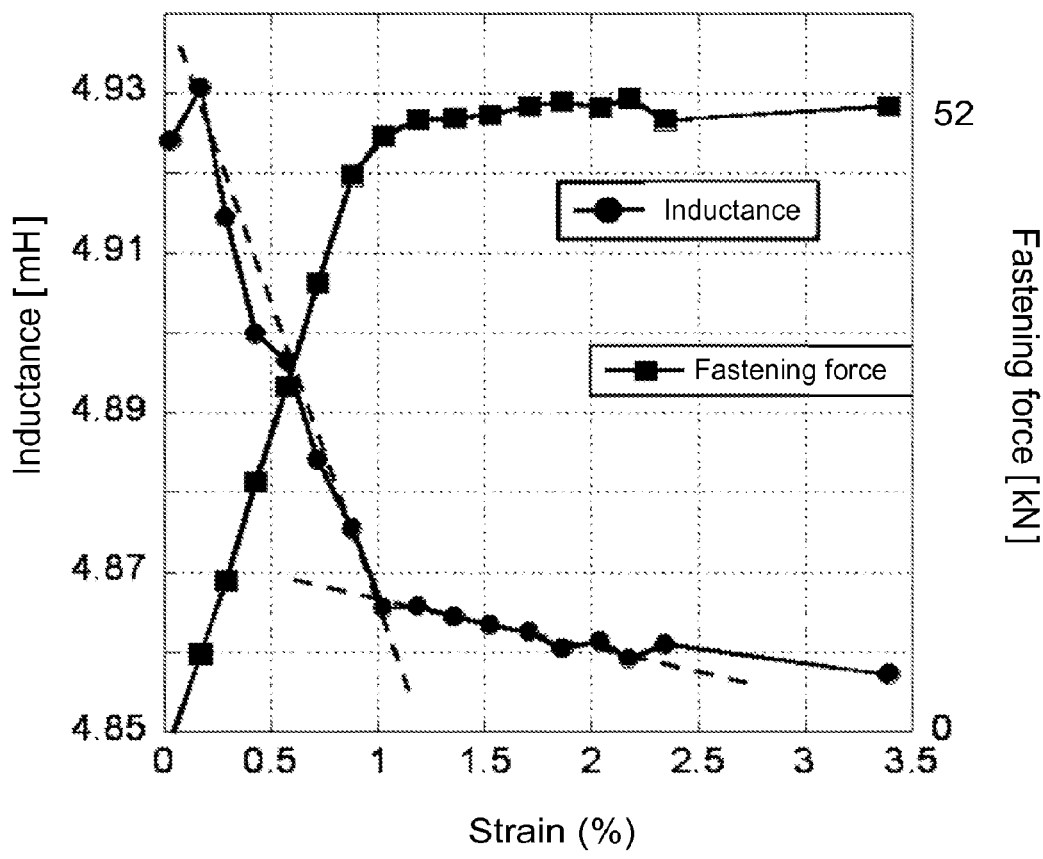
FIG. 2b discloses an example of a diagram for detecting a significant change of a physical quantity based on the inductance.

In the same manner as in FIG. 2a, FIG. 2b discloses a diagram where the physical quantity inductance in relation to the strain and the fastening force in relation to the strain is shown. The determination of the significant change of the physical quantity the inductance is realized in a corresponding way.

Figure 3A:
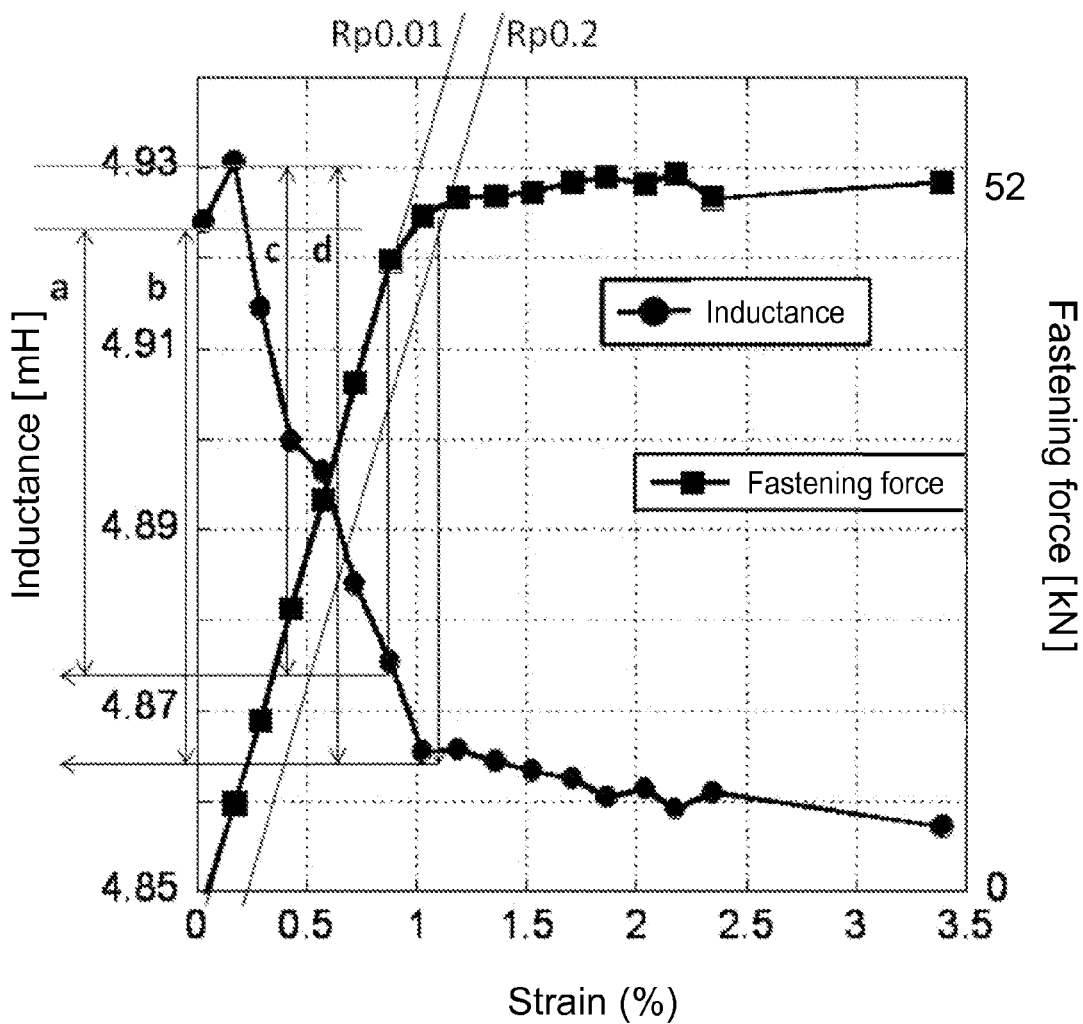
FIG. 3a discloses an example of a diagram for detecting a significant change of a physical quantity based on the inductance.

FIG. 3a discloses a diagram of the inductance and the fastening force with the strain of the fastening element 3. In FIG. 3a the significant change of the physical quantity the inductance is detected by means of identifying an absolute change of the inductance based on an initial value or a maximal value.

The absolute change of the physical quantity the inductance from an initial value or a maximal value is dependent on the type of fastening element and tensile yield limit definition. In FIG. 3a the detection of the significant change is shown based on four different signal changes, marked with a, b, c, d, from an initial value to the tensile yield limit load Rp0.01 and Rp0.2 for a certain type of fastening element. For the signal changes a and b, the significant change of the physical quantity the inductance is based on an initial value of the physical quantity. For the signal changes c and d, the significant change of the inductance is based on a maximal value of the physical quantity.

There are different definitions of the tensile yield limit load, such as Rp0.01 and Rp0.2. For the signal changes a and c the detection of the significant change of the physical quantity the inductance is realized for a tensile yield limit load of type Rp0.01. For signal changes b and d the detection of the significant change of the physical quantity the inductance is realized for a tensile yield limit load of type Rp0.2.

Figure 3B:
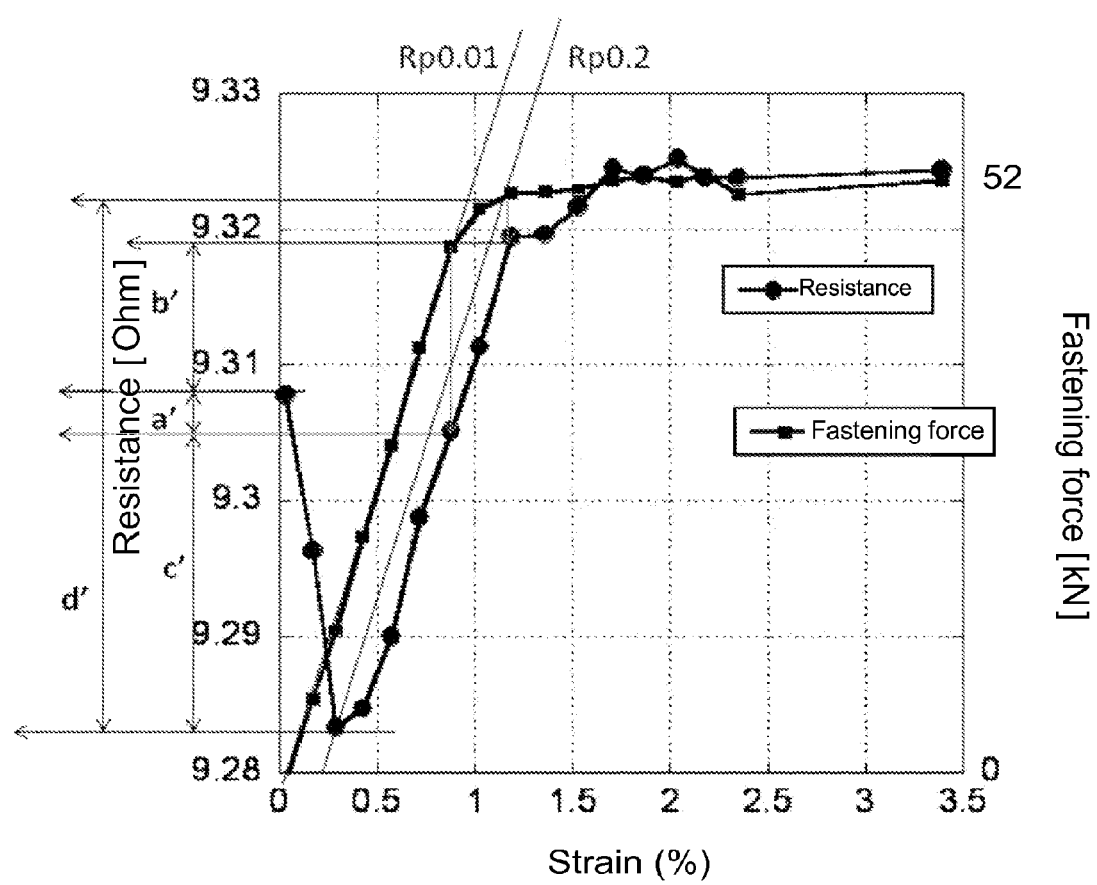
FIG. 3b discloses a further example for detecting a significant change of the physical quantity based on the resistance.

In the same way as shown in FIG. 3b, a detection of the significant change of the physical quantity the resistance in relation to strain is shown. The detestation of the significant change of the physical quantity the resistance is realized from an initial value of the physical quantity the resistance for the signal changes a' and b', and from a minimum value of the physical quantity the resistance for the signal changes c' and d'. The detection of the significant change of the physical quantity the resistance is realized in a corresponding way to the determination according to FIG. 3a.

Figure 4:
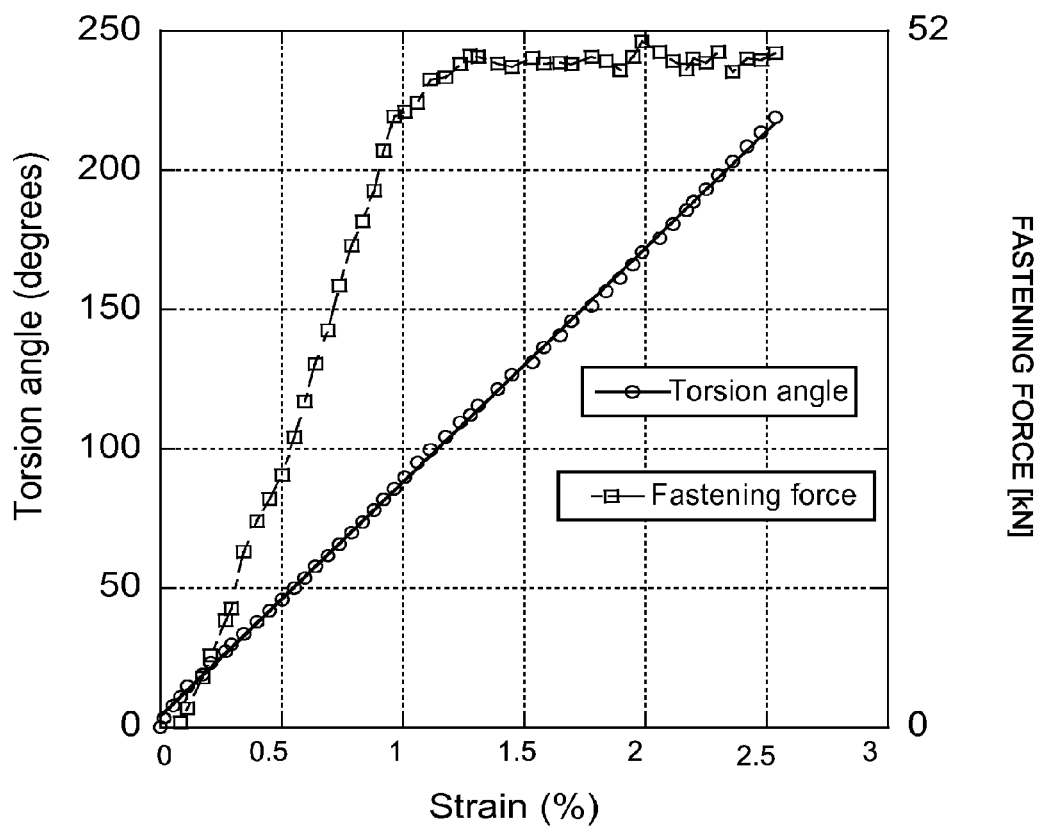
FIG. 4 discloses a diagram that indicates a dependency between torsion angle, fastening force and strain of a fastening element.

FIG. 4 discloses a diagram that presents a dependency between torsion angle, fastening force and strain of the fastening element 3. The strain of the shaft 7 is determined based on a torsion of the fastening element 3 or a fastening installation element with a torsion angle.

The torsion corresponds to a strain and an fastening force of the shaft 7 of the fastening element 3. The dependency between the torsion angle, the fastening force and the strain of the fastening element 3 depend on a threaded pitch of the threaded shaft or the fastening installation element. The fastening installation element, not disclosed in the figure, is for example a bolt or similar element that at rotation is pressed towards the piece 5, which results in an increased stress of the shaft 7 of the fastening element 3.

Figure 5:
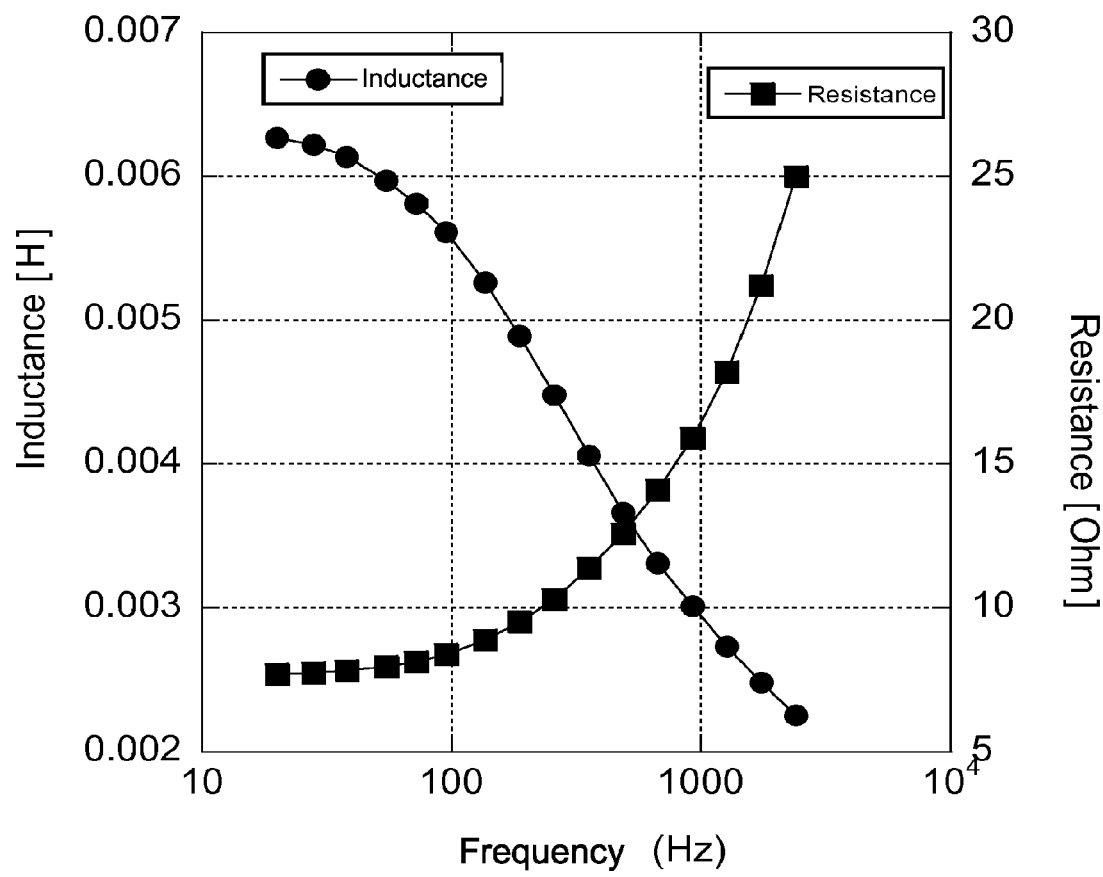
FIG. 5 discloses a diagram that indicates a dependency between inductance and resistance of a coil with frequency of an alternating magnetic field.

FIG. 5 discloses how the inductance and the resistance vary with the frequency when the coil 9 is positioned in connection to the fastening element 3. For example, the coil 9 is positioned above the torsion head 8. The coil 9 generates an alternating magnetic field that influence the torsion head 8 and the shaft 7 of the fastening element 3, which torsion head 8 and shaft 7 in turn influence the inductance and the resistance of the coil 9. FIG. 5 discloses accordingly the magnetic response from the fastening element 3 measured with the coil 9. At an increase in the frequency of the alternating magnetic field the resistance and the inductance of the coil 9 decrease, and vice verse.

An electrical impedance of the coil 9 in vicinity of the fastening element 3, for example at the torsion head 8 of the fastening element 3, is being measured. The electrical impedance of the coil 9 can be described as $z(f)=R(f)+j\omega L$, where R is the electrical resistance that in turn depends on the magnetic losses in the fastening element 3, the piece 5 and the torsion socket 13, L is the inductance with magnetic response in phase with the excitation of the fastening element 3, the piece 5 and the torsion socket 13, and $\omega=2\pi f$, where f is the excitation frequency in the coil 9, the alternating magnetic field from the coil 9 is used for measuring the impedance of the coil 9 in a specific frequency interval from a couple of Hz to several kHz and has a constant excitation amplitude of about 0.1 mT and with direction that corresponds with the direction of the mechanical stress (strain) that is to be measured. A typical measurement of L and R as a function of frequency when the coil 9 is being arranged in vicinity of the fastening element 3, the torsion socket 13 and the piece 5 is shown in FIG. 5.

Figure 6:
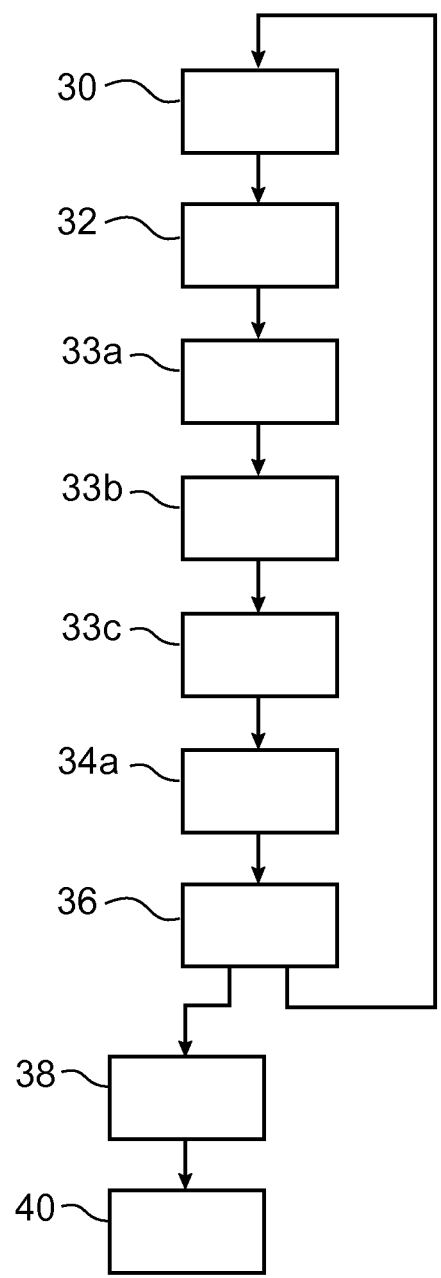
FIG. 6 discloses a block diagram over a method according to a second embodiment of the invention.

For certain materials of the fastening element 3, it is difficult to determine the tensile yield point based on a deviation of the constant rate of change of the physical quantity at the tensile yield point. FIG. 6 discloses a block diagram over a method according to a second embodiment of the invention, which is suitable to use in such situations.

The method differs from the method shown in FIG. 1c in that the The comprises the steps of, in a block 33a, determining the strain of the shaft 7 of the fastening element 3. The strain of the shaft 7 can for example be determined based on a rotation of the fastening element 3 or a threaded fastening installation element, and a threaded pitch of said threaded shaft 7 or fastening installation element.

The method further comprises the step, in a block 33b, identifying a mainly constant rate of change of the physical quantity in relation to the strain of the shaft 7 while fastening the fastening element 3. An example of establishment of constant rate of change is shown in FIG. 7a and illustrated in the form of a first line L1.

When fastening the fastening element 3 the strain in the shaft 3 of the fastening element 3 gradually increases. Thus, during fasting of the fasting element 3 values on the physical quantity with the strain are collected and saved in a memory unit of the control unit 16. The mainly constant rate of change of the physical quantity is identified by for example finding an average of the collected values, which average is illustrated with the first line L1.

Figure 7A:
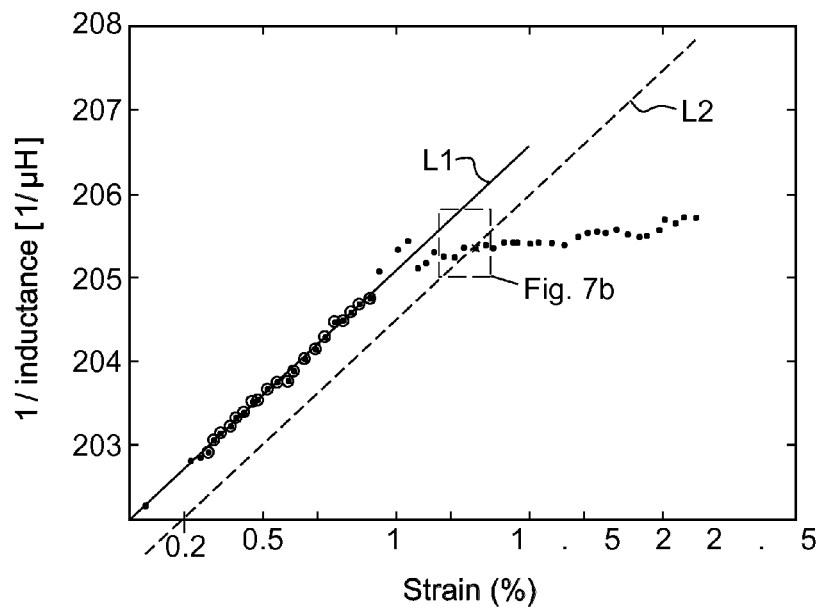
FIG. 7a discloses an example of a diagram for detecting a significant change based on the inductance and an offset strain.

The method further comprises the step, in a block 33c, establishing a line L2 in the graph representing the strain on a first axis versus the physical quantity on a second axis, see FIG. 7a. The line L2 is established so that the line L2 originates from the first axis at a certain offset strain, in FIG. 7a 0.2% strain, and extending with the identified mainly constant rate of change of the physical quantity.

The method further comprises the step, in a block 34a, detecting the significant change of the physical quantity relating to the tensile yield limit load of the fastening element 3 when the measured physical quantity with the determined strain intersects the established line L2. The intersection is detected when a difference D1 between the measured physical quantity and the value of the physical quantity of the established line at the determined strain and the corresponding strain of the established line L2 is less than a second certain value C2.

By means of using the offset strain value, identifying a constant rate of change of the physical quantity with the strain, establishing the line L2 comprising the identified constant rate of change and finding the intersection of the measurements with the established line, the tensile yield limit load can more reliable be detected in comparison to other ways of detecting the significant change. This is in particular of importance for fasting elements 3 that provide a weak response on the significant change of the physical quantity at the tensile yield limit load.

FIG. 7a discloses an example of a graph used for detecting the significant change relating to a tensile yield limit load of the method disclosed in FIG. 6. The first axis of the graph, in this case the x-axis, represents the determined strain of the shaft 7. The second axis of the graph, in this case the y-axis, represents the measured physical quantity the inverse inductance.

The measurements of the inverse inductance and the determination of the strain of the shaft 7 are collected continuously during fasting the fasting element 3. The values of the measurements of the inverse inductance and the determination of the strain is plotted in the graph and is depicted as dots in the graph.

After sufficient values of the inverse inductance with the strain have been collected, a constant rate of change is established. In FIG. 7a, the constant rate of change is established based on the encircled dots in the graph and illustrated by the first line L1.

After that the constant rate of change has been established, a second line L2 is established, which second line L2 originates from the first axis with a certain offset strain, in this case 0.2% strain, and extends from the first axis with the established constant rate of change, i.e. the slope of the first line L1. Accordingly, the second line L2 has the same inclination as the first line L1.

Figure 7B:
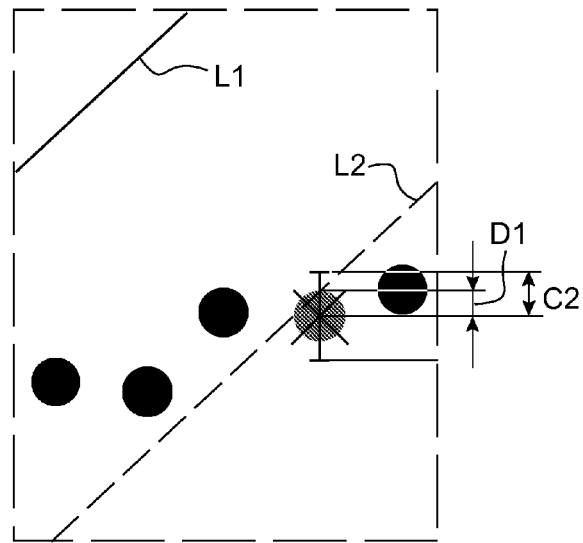
FIG. 7b discloses an enlargement of a part of FIG. 7a where the significant change is detected.

The significant change of the measured inverse inductance is detected when the difference D1 between the measured physical quantity at the determined strain and the value of the physical quantity of the established line L2 at the corresponding strain of the established line L2 is less than a second certain value C2, see FIG. 7b disclosing an enlargement of a part of FIG. 7a where the significant change is detected for the dot marked with an X and an error margin. Thus, the significant change is detected when the measured values of the inverse inductance with the strain intersects the established line L2 with the error margin.

The magnetic susceptibility at low excitation frequencies, $\chi$ can be described as inverse proportional to the magnetic anisotropy, K. This is in particular true for material with a susceptibility that has a low degree of influence with thermal variations.

For a material the following relation is present:

$$\chi \propto \frac{1}{K}$$

where K can be written as:

$$K = K_0 + C\sigma$$

and where $\sigma$ is the mechanical stress in the fastening element 3, C is a constant that depends on the materials magnetostriction and $K_0$ is the magnetic anisotropy without added mechanical stress. The inductance for the coil system is proportional to the permeability of the magnetic material that is in close connection with the coil system.

The permeability is about equal to the susceptibility, because $\chi \gg 1$:

$$L \propto \mu \approx \chi$$

which results in that:

$$L \propto \chi \propto \frac{1}{K} \propto \frac{1}{K_0 + C\sigma}$$

thus:

$$\frac{1}{L} \propto K_0 + C\sigma$$

Accordingly, if 1/L is plotted with the strain the strain curve for the fastening element is reflected provided that the surrounding magnetic material is not being deformed during the torsion, such as the torsion socket 13 or the piece 5.

The invention is not limited to the disclosed embodiments but can be modified and varied within the framework for the following claims.

For example the first current supply unit 12 and the second current supply unit 22 can be the same current supply unit. The torsion force is transmitted either by means of an external torsion socket 13, such as shown in FIGS. 1a and 1b, or by means of an internal tool, such as a female screw tool.

The means 9, 12 for generating the alternating magnetic field and the means 9, 14 for measuring the physical quantity is located either in a static condition or in a rotating condition together with a torsion transfer unit 13, 19 rotating the fastening element 3 or fastening installation element.

The invention claimed is:

1. A device for indicating if a fastening element upon fastening to a piece has reached a tensile yield limit load, wherein the fastening element comprises a threaded shaft, which shaft comprises a magnostrictive material, wherein the device comprises:
    means for generating an alternating magnetic field that penetrates the shaft,
    means for measuring a physical quantity in response to the generating of an alternating magnetic field,
    a control unit adapted to receive measured values of said physical quantity, characterized in that the means for measuring the physical quantity comprises a sensor element adapted to be exposed to said magnetic field after the magnetic field's penetration of the shaft, wherein said physical quantity is at least one of a resistance and an inductance of the sensor element that depend on the momentary magnetic susceptibility of the shaft, wherein the control unit is adapted to identify: 1a) a mainly constant rate of change of the physical quantity in relation to a strain of the shaft, or 1b) any of an initial value or maximal value of the physical quantity in relation to a strain of the shaft, and detect a significant change of the physical quantity corresponding to: 2a) a deviation from the mainly constant rate of change of the physical quantity exceeds a first certain value, or 2b) an absolute change of the physical quantity from any of an initial value or maximal value and on basis of the significant change determine and indicate if the shaft of the fastening element has reached the tensile yield limit load.

2. The device according to claim 1, wherein the means for generating the alternating magnetic field is adapted to receive an alternating electric current with a frequency between 28 Hz and 350 Hz, wherein said alternating magnetic field is being generated.

3. The device according to claim 2, wherein the strain of the shaft is determined based on a rotation of the fastening element or a threaded fastening installation element, and a threaded pitch of said threaded shaft or fastening installation element.

4. The device according to claim 1, wherein the sensor element is adapted to at least partly surround a torsion head of the fastening element while the torsion head is influenced by a torsion force.

5. The device according to claim 1, wherein the means for generating the alternating magnetic field comprises an inductive component, which inductive component is adapted to at least partly surround a torsion head of the fastening element while the torsion head is affected by a torsion force.

6. The device according to claim 1, wherein the device comprises means for generating a static magnetic field that penetrates the shaft.

7. The device according to claim 1, wherein the device comprises a torsion transfer unit adapted to transfer a torsion force to the fastening element or a threaded fastening installation element, wherein the torsion transfer unit is adapted, by means of the control unit, to be controlled in dependency of a reached tensile yield limit load.

8. The device according to claim 7, wherein the torsion transfer unit is adapted, based on the indication of a reached tensile yield limit load, to rotate the fastening element so that the load of the fastening element is corrected with a certain correction value.

9. A method for indicating if a fastening element upon fastening to a piece has reached a tensile yield limit load, wherein the fastening element comprises a threaded shaft, which shaft comprises a magnetostrictive material, wherein the method comprises the steps of:
    generating an alternating magnetic field that penetrates the shaft,
    measuring a physical quantity that comprising at least one of a resistance and an inductance that depend on the momentary magnetic susceptibility of the shaft,
    detecting a significant change of the physical quantity by identifying: 1a) a mainly constant rate of change of the physical quantity in relation to a strain of the shaft, or 1b) any of an initial value or a maximal value of the physical quantity in relation to a strain of the shaft,
    detecting a significant change of the physical quantity corresponding to: 2a) a deviation from the mainly constant rate of change of the physical quantity exceeds a first certain value, or 2b) an absolute change of the physical quantity from any of an initial value or maximal value, determining if the shaft of the fastening element has reached the tensile yield limit load based on the significant change of the physical quantity, and indicating that the fastening element has reached the tensile yield limit load in dependency of said determination.

10. The method according to the claim 9, wherein the means for generating the alternating magnetic field receives an alternating electric current with a frequency between 28 Hz and 350 Hz, wherein said alternating magnetic field is being generated.

11. The method according to claim 9, wherein the method comprises:

identifying a mainly constant rate of change of the physical quantity in relation to an increased strain of the shaft, establishing a line in a graph representing the strain on a first axis versus the physical quantity on a second axis so that the line originates from a certain offset strain value at the first axis and extends with said identified constant rate of change, detecting said significant change of the physical quantity when the measured physical quantity intersects the established line with a certain error margin, and indicating that the fastening element has reached the offset tensile yield limit load if the measured physical quantity intersects the established line with the certain error margin.

12. The method according to claim 9, wherein the method comprises:

rotating the fastening element based on an indication of a reached tensile yield limit load so that the load of the fastening element is corrected with a certain correction value.

13. A method for indicating if a fastening element upon fastening to a piece has reached a tensile yield limit load, wherein the fastening element comprises a threaded shaft, which shaft comprises a magnetostrictive material, wherein the method comprises the steps of:

generating an alternating magnetic field that penetrates the shaft, determining the strain of the shaft, identifying a mainly constant rate of change of the physical quantity in relation to an increased strain of the shaft, establishing a line in a graph representing the strain on a first axis versus the physical quantity on a second axis so that the line originates from a certain offset strain value at the first axis and extends with said identified constant rate of change, detecting said significant change of the physical quantity when the measured physical quantity intersects the established line with a certain error margin, and indicating that the fastening element has reached the offset tensile yield limit load if the measured physical quantity intersects the established line with the certain error margin.

* * * * *